US006735194B1

(12) United States Patent
Lee et al.

(10) Patent No.: US 6,735,194 B1
(45) Date of Patent: May 11, 2004

(54) DIGITAL PRIVATE SIGNALING SYSTEM OVER INTERNET PROTOCOL

(75) Inventors: Gordon Lee, Kanata (CA); Steve Szeto, Kanata (CA)

(73) Assignee: Mitel Corporation (CA)

( * ) Notice: Subject to any disclaimer, the term of this patent is extended or adjusted under 35 U.S.C. 154(b) by 0 days.

(21) Appl. No.: 09/568,703

(22) Filed: May 11, 2000

(30) Foreign Application Priority Data

May 11, 1999 (GB) .............................................. 9910931

(51) Int. Cl.[7] .............................................. H04L 12/66
(52) U.S. Cl. ........................ 370/352; 370/356; 370/389
(58) Field of Search ................................ 370/352, 353, 370/356, 351, 389

(56) References Cited

U.S. PATENT DOCUMENTS

| | | | | |
|---|---|---|---|---|
| 5,537,469 A | * | 7/1996 | Beniston et al. | 379/229 |
| 6,275,574 B1 | * | 8/2001 | Oran | 379/201 |
| 6,333,931 B1 | * | 12/2001 | LaPier et al. | 370/385 |
| 6,570,869 B1 | * | 5/2003 | Shankar et al. | 370/352 |
| 2003/0081590 A1 | * | 5/2003 | Maroulis et al. | 370/352 |

FOREIGN PATENT DOCUMENTS

| | | | | |
|---|---|---|---|---|
| EP | 0564215 | | 6/1993 | |
| GB | 2265793 A | * | 6/1993 | ........... H04Q/11/04 |

* cited by examiner

Primary Examiner—Alpus H. Hsu
Assistant Examiner—Michael J Molinari
(74) Attorney, Agent, or Firm—Jones Day (57) ABSTRACT

A packet switched communication system providing DPNSS standard voice and signaling data over IP, comprising connection services software for mapping IP addresses and port numbers to thirty IP trunks, wherein each of the IP addresses is used by a network layer of the DPNSS standard to route packets to a predetermined terminating node and each of the port numbers is used by a link layer of the DPNSS standard to deliver signaling data to a predetermined port within the terminating node. A far end message interface thread is provided for placing the signaling data and a Link Access Protocol (LAP) number into a data portion of each IP packet to permit reassociation of the signaling data at the terminating node to an associated one of the IP trunks.

6 Claims, 9 Drawing Sheets

DIGITAL PRIVATE SIGNALING SYSTEM OVER INTERNET PROTOCOL

FIELD OF THE INVENTION

The present invention relates in general to network-based voice communications, and more particularly to a system for transporting DPNSS (Digital Private Signaling System) signaling and voice using Internet Protocol (IP).

BACKGROUND OF THE INVENTION

As set forth in BTNR 188 Digital Private Network Signaling System (DPNSS), the DPNSS standard defines three interface layers: the physical layer, the link layer and the network layer. The physical layer can be implemented on an E1 or T1 digital trunk and provides physical transport for voice and signaling. The link layer defined in the standard provides reliable transport for signaling information and requires a 64 Kbps channel using HDLC framing. The network layer defines the signaling data and deals with call establishment, calling information, call clearing and call feature transparency between network nodes. It is supported within the Call Control Software of a Telecoms Server.

Traditionally DPNSS has been transported over a TDM (Time Division Multiplexing) infrastructure that is E1 (or T1) based. This has required separate voice and data wiring which contributes to system cost. Another limitation of E1 trunks using DPNSS is that E1 (or T1) trunks provide a point to point connection. All 30 channels within an E1 link are required to terminate between the same network nodes.

SUMMARY OF THE INVENTION

According to the present invention, a system is provided for implementing the DPNSS protocol and voice transport over IP (Internet Protocol). A principal benefit of the system according to the present invention is that it is possible to use the existing data wiring infrastructure of a LAN (Local Area Network). In many situations this eliminates the need for a separate transport infrastructure which reduces the customer's monthly recurring charges of a leased trunk service. Also, because IP is a switched service each trunk can be individually programmed to terminate between two network nodes. In addition, the signaling information associated with the trunk is routed over the network. This provides more flexibility and better utilization of trunk resources than prior art E1 and T1 based systems.

BRIEF DESCRIPTION OF THE DRAWINGS

A more detailed description of the invention and the prior art is provided herein below with reference to the accompanying drawings, in which.

DETAILED DESCRIPTION OF THE PREFERRED EMBODIMENT

Figure 1:
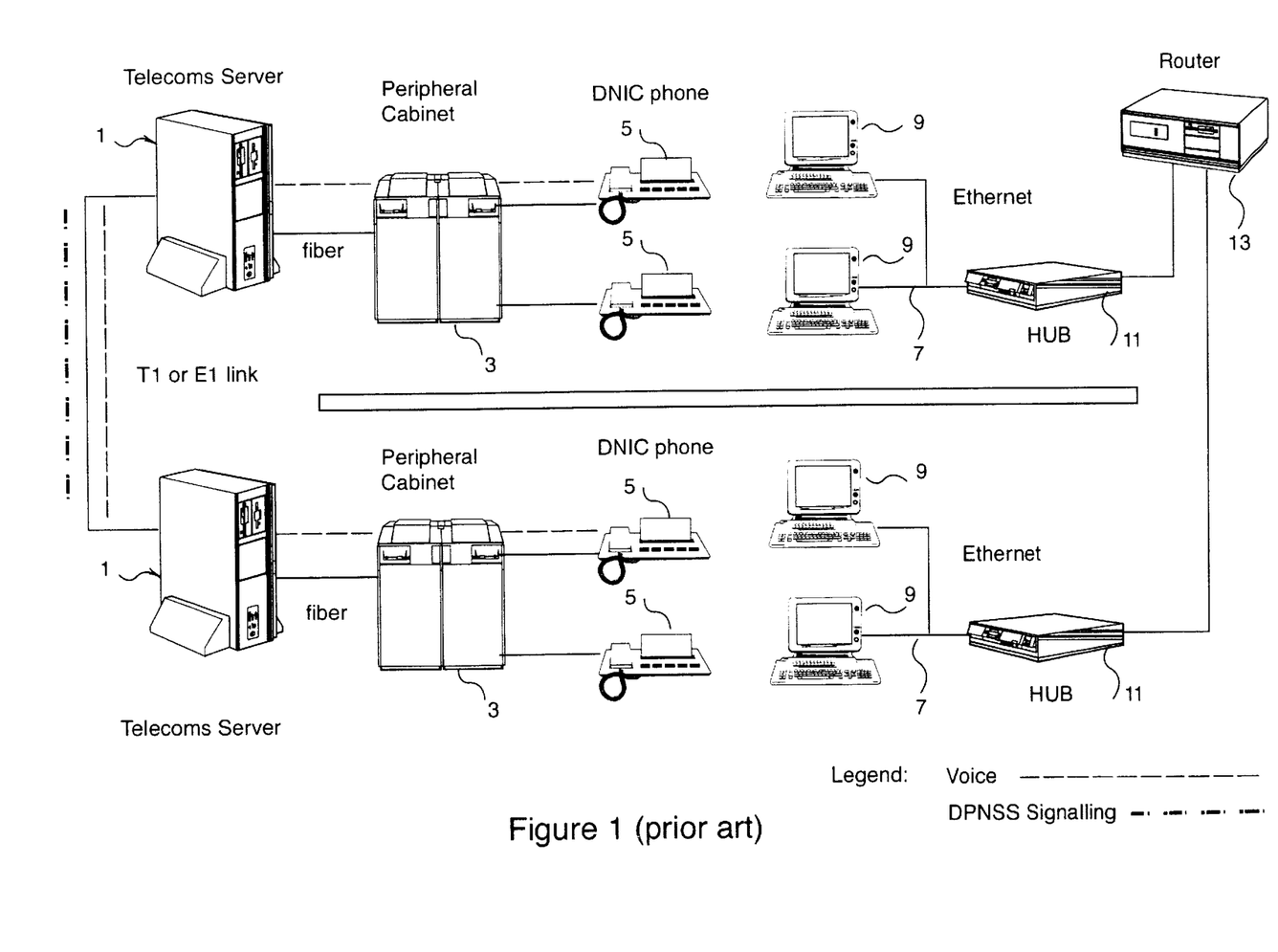
FIG. 1 is a schematic representation of a prior art TDM DPNSS system and associated network.

FIG. 1 shows a typical prior art TDM DPNSS system interconnecting two geographically separated locations. A PBX (Private Branch Exchange) is implemented at each site comprising a Telecoms Server 1, and at least one Peripheral Cabinet 3 to which multiple telephones 5 are connected. A PC-based PBX such as shown in FIG. 1 is known in the art. One example of such a system is described in Canadian Patent Application No. 2236525 entitled Method and Apparatus for Migrating Embedded PBX System to Personal Computer. The telephones 5 are digital telephones which communicate voice and data over two 64 kbit/s voice channels and one 16 kbit/s data channel (2B+D) using a Mitel® Corporation Digital Network Interface Circuit (DNIC). As is common practice, each site is also provided with a data network implemented via an Ethernet LAN 7 for connecting a plurality of PCs 9 (Personal Computers) using the well-known TCP/IP protocol. Multiple PCs 9 are connected to a hub 11 which, in turn communicates with a remote LAN via a router 13 (e.g. via ISDN (Integrated Services Digital Network)), in a well known manner.

Figure 2:
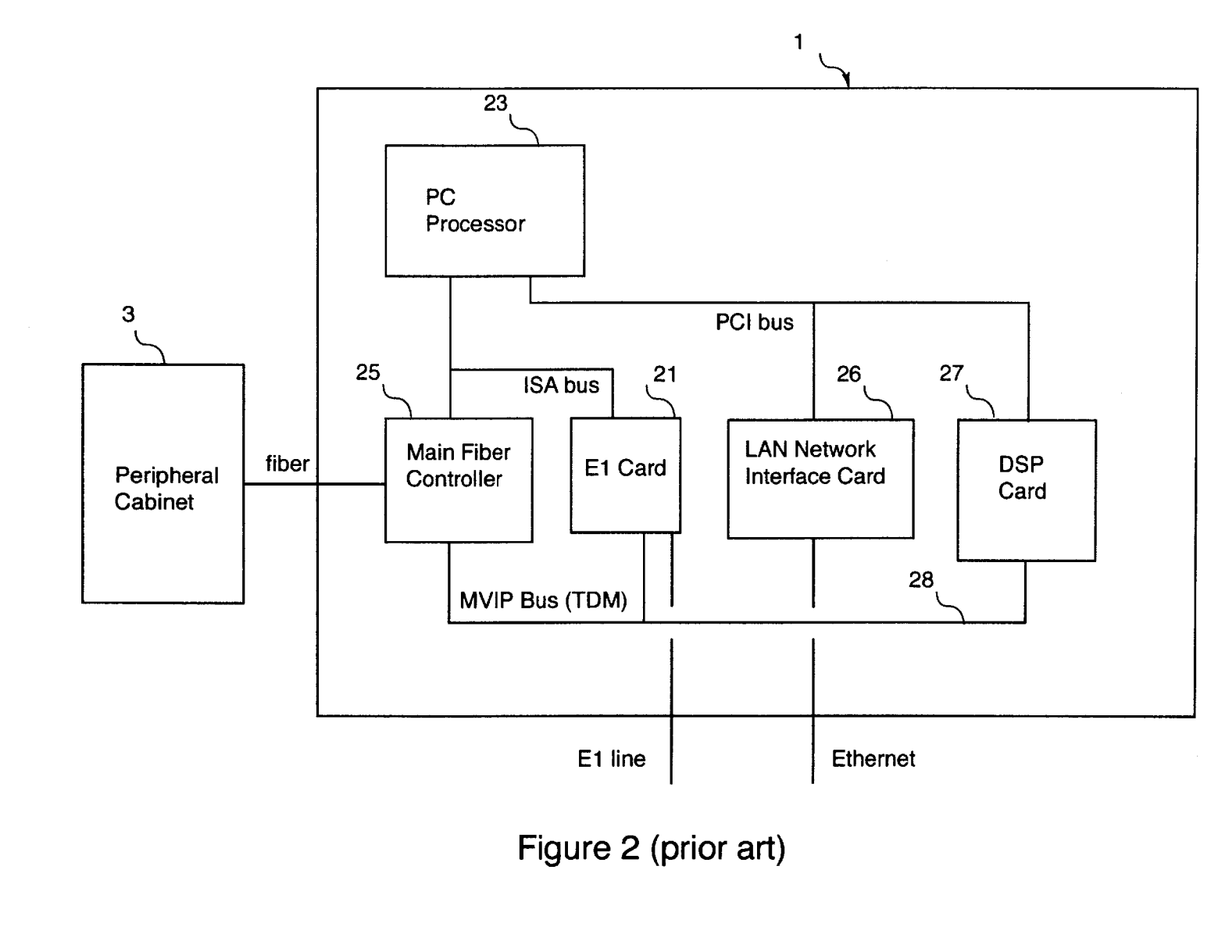
FIG. 2 is a hardware block diagram of a Telecoms Server and Peripheral Cabinet of the prior art system shown in FIG. 1.
Figure 3:
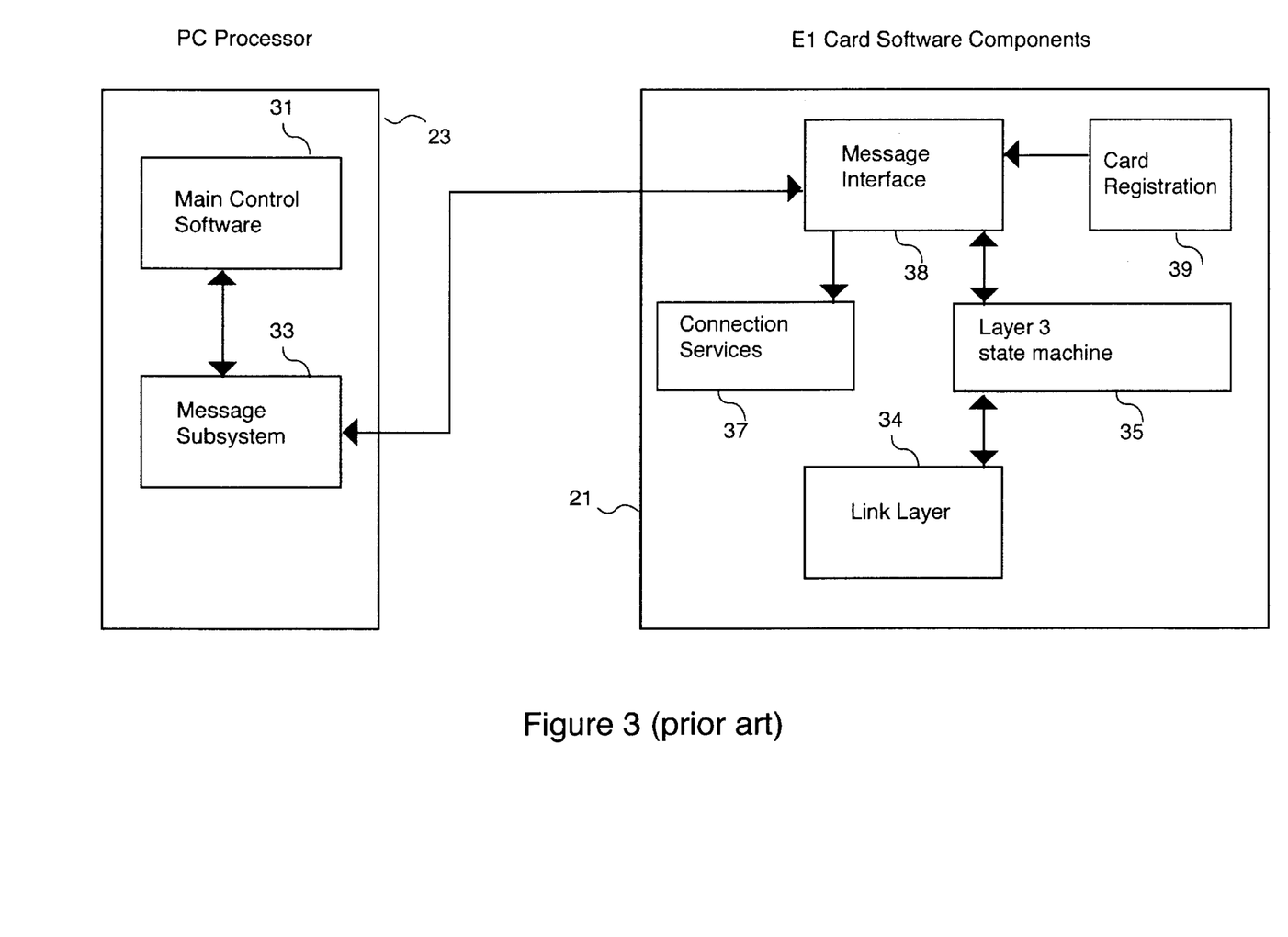
FIG. 3 is a software block diagram showing components of a PC Processor and E1 card for implementing the prior art DPNSS system of FIGS. 1 and 2.

Turning to FIGS. 2 and 3, a PC Processor 23 is shown for executing Main Control Software 31, which includes call control software for implementing call features, connection control, trunk message handling, and desktop set message handling, in a well known manner. The Main Control Software 31 also provides customer data entry, a database, as well as maintenance software.

Identical reference numerals are used in FIGS. 2 and 3 (and FIGS. 5 and 6, below) for both the hardware and software aspects of the same functional components. Thus, the PC Processor is identified in FIG. 2 as a hardware device using reference 23 whereas in FIG. 3 the same reference numeral is used to indicate software components of the PC Processor.

A T1 (or E1) card 21 resides in each Telecom Server 1 for facilitating DPNSS signaling between the remote sites. Message Subsystem 33 supports communication to PC cards such as E1 card 21, Main Fiber Controller 25, LAN Network Interface card 26 and DSP card 27 via ISA/PCI busses and communicates with other processes residing in the processor 23.

As discussed in greater detail below, each EI card supports the physical and link layers defined in the standard. The layer 3 messages are handled within the call control component of the Main Control Software 31 of the PBX and are transported from the E1 card 21 to the Main Control CPU 23 via the message based communication infrastructure 33.

The Main Fiber Controller 25 is provided with a switching matrix which permits any channel from the E1 line to be cross connected over an MVIP bus 28. The Controller 25 also provides message transport to Peripheral Cabinet 3, a fiber mux to transport voice and signaling to the Peripheral Cabinet 3, and provides transport for trunk and desktop messages to/from the call control software residing in the PC processor 23.

The DSP Card 27 provides centralized tone generation, tone detection and conferencing, in a well-known manner.

The Peripheral Cabinet 3 houses line and analog trunk cards and contains a Peripheral processor which supports software drivers for the line and trunk interfaces.

As discussed briefly above, the prior art E1 card 21 provides the DPNSS layer 1 physical interface, implements the DPNSS link layer (layer 2) protocol via Link Layer software 34 and implements a state machine 35 for handling layer 3 (DPNSS) messages. The E1 card 21 also provides transport for layer 3 messages to/from the main control software 31 residing in the PC processor 23 using a Message Interface 38. The E1 card software provides Connection Services 37 for connecting B channels from the E1 line to the MVIP bus 28. Message Interface 38 uses message system registration 39 to identify itself as an E1 card and establish a communication link with the main control software 31.

Figure 4:
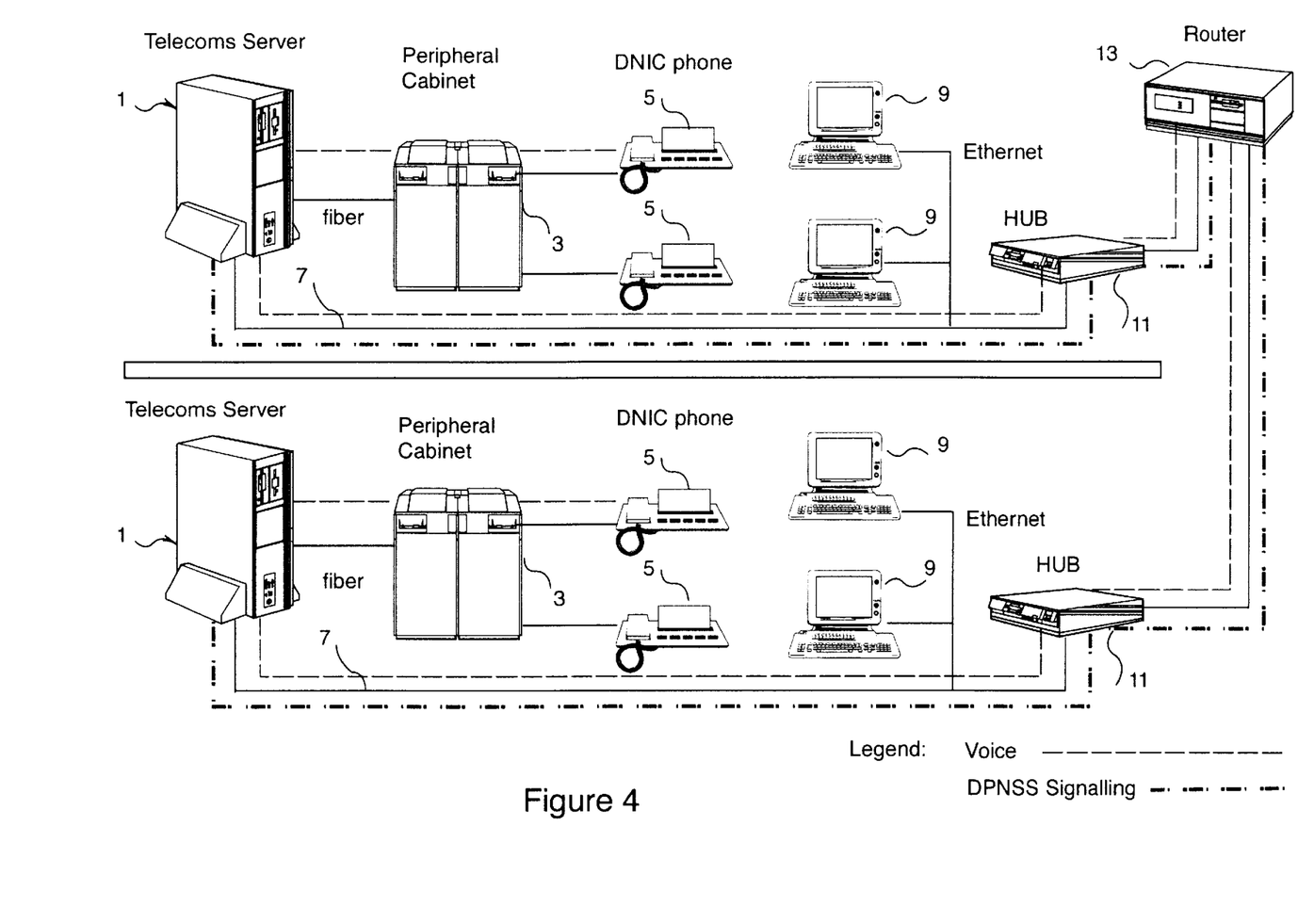
FIG. 4 is a schematic representation of a DPNSS system according to the present invention.

The system according to the present invention is shown generally with reference to FIG. 4 wherein it will be noted that DPNSS signaling and voice are both transported over the LAN 7. More particularly, according to the present invention the DPNSS link layer is replaced by TCP/IP, and the physical layer is replaced by the Ethernet LAN 7.

Figure 5:
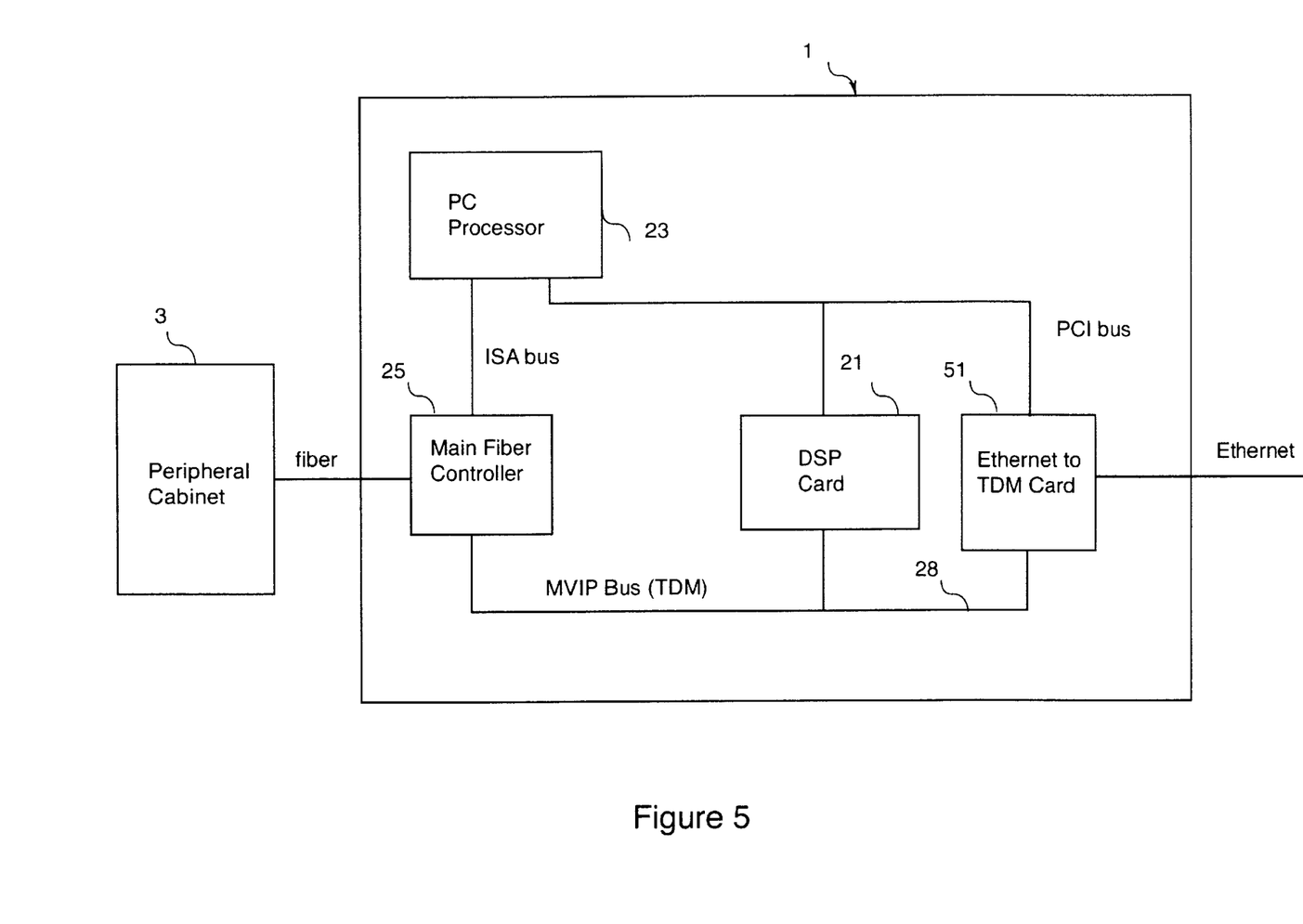
FIG. 5 hardware block diagram of a Telecoms Server and Peripheral Cabinet of the system according to the present invention shown in FIG. 4.
Figure 6:
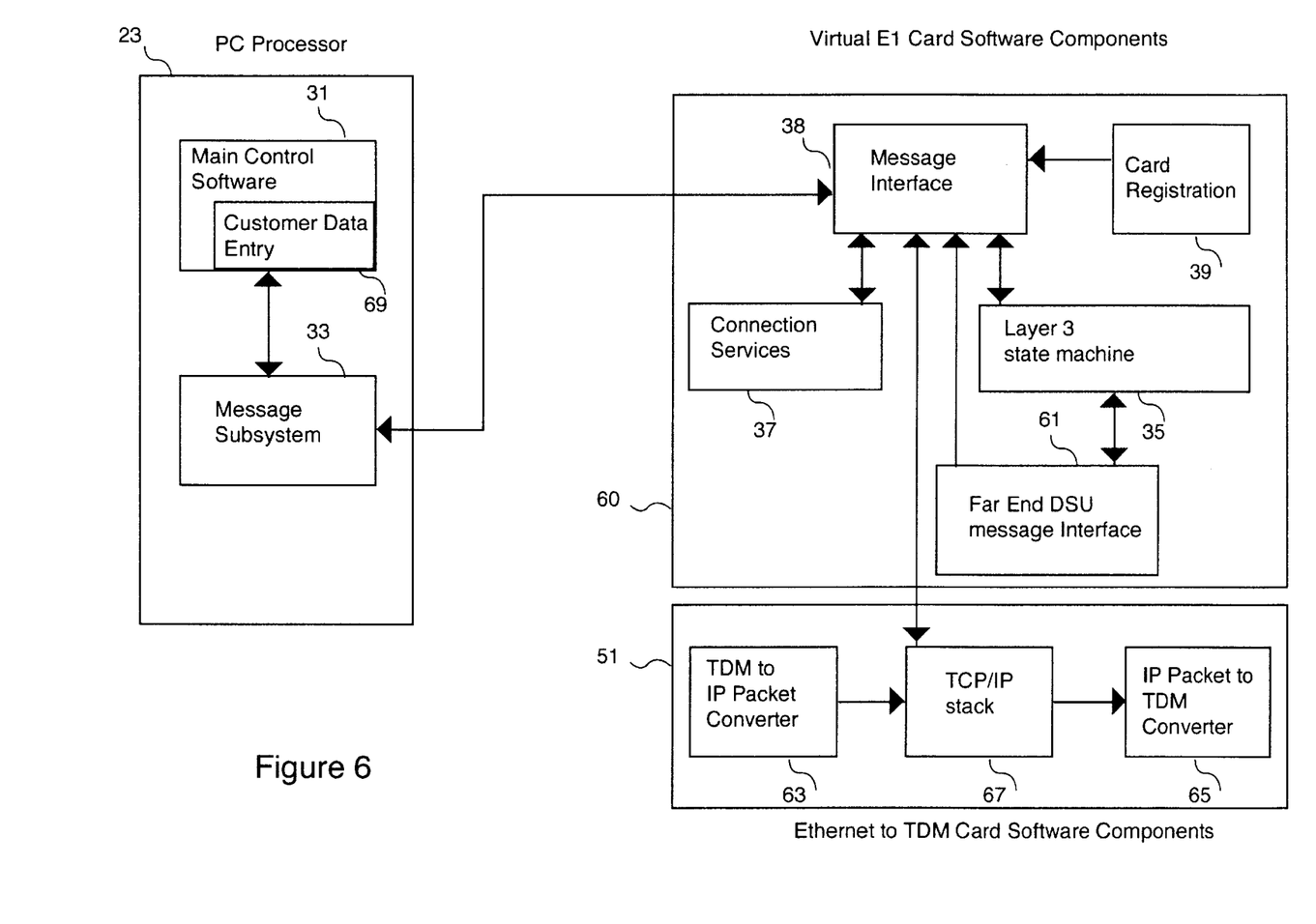
FIG. 6 is a software block diagram showing components of a PC Processor and virtual E1 card for implementing the DPNSS system of FIGS. 4 and 5.

Turning to FIGS. 5 and 6, in conjunction with FIG. 4, additional implementation details of the preferred embodiment are provided.

According to the preferred embodiment, the hardware E1 card 21 of the prior art is replaced by virtual E1 card software components 60 running as processes in the PC processor 23, thereby maintaining the existing interface to the PBX software (Main Control Software 31 and Message Subsystem 33). An Ethernet-to-TDM (E2T) card 51 uses packet based transport for converting a TDM voice channel into a stream of IP voice packets and vice versa (blocks 63 and 65) using the G.711 encoding standard, to provide 30 IP trunks.

The PC Processor 23, with Main Control Software 31 and Message Subsystem 33 operate substantially as discussed above with reference to FIG. 2 and 3, except that a Customer Data Entry (CDE) function 69 is provided to permit the configuration of the 30 IP trunks. As discussed briefly above, one of the features offered by the DPNSS-over-IP system of the present invention that a dedicated E1 trunk can not, is the ability to route each of the 30 IP trunks to individual network nodes. This is possible because each IP packet can be routed whereas an E1 link is a point-to-point fixed connection.

In response to user input of data via the Customer Data Entry function 69, programmed trunk groups are created which represent the various destination network nodes. The trunk groups are then assigned trunks from the 30 IP trunks represented by the virtual E1 card 60, which is a type of DPNSS DSU (Digital Service Unit). Examples of well-known DSUs are DSI or CEPT DPNSS cards, ISDN Gateways, Applications Gateways, etc. A numbering plan is then programmed to permit correct trunk group selection based on digits dialed (i.e. Using Automatic Route Selection Programming).

Figure 7:
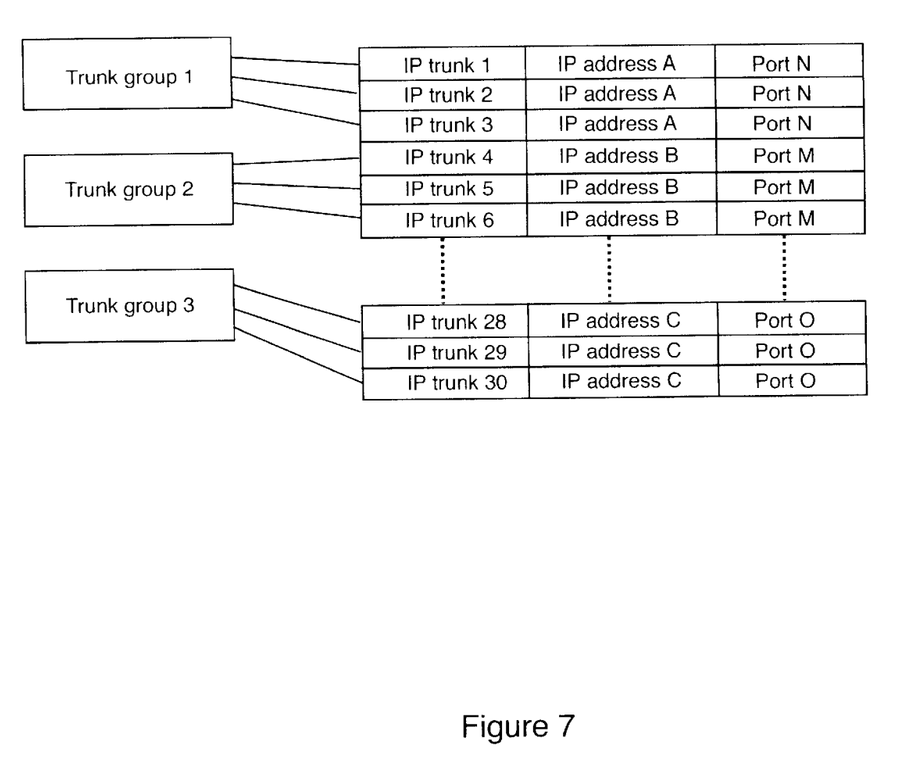
FIG. 7 is a tabular representation of an example IP addressing and port assignment according to the present invention.

An IP address is assigned corresponding to the terminating node for each IP trunk. The IP address permits both the signaling and voice packets to be routed to the correct network node. Additionally, a port number must be assigned to each IP trunk. The IP address is used by the Network layer which uses the Internet Protocol to route packets to the terminating node. The port number is used by the Link layer which uses the Transmission Control Protocol (TCP) to deliver the signaling data to the specified port number that the remote DPNSS DSU application associated with the terminating network node is listening to. An example of such IP addresses and port assignments is shown in FIG. 7.

The Main Fiber Controller 25 and DSP card 21 also function as discussed above in relation to the prior art.

The virtual E1 card software components 60 provide implementation of address translation software to route the signaling packets to the correct end node and receiving DSU application. Additionally, a Link Access Protocol (LAP) number must be added to the data portion of the packet to permit the reassociation of the signaling data to the correct IP trunk. Traditionally the LAP was encoded as part of the link layer protocol of the DPNSS standard. However, since the present invention utilizes TCP/IP as the link layer, the LAP must be explicitly encoded in the data section of the packet.

The D channel for DPNSS implements sixty logical Link Access Protocols (LAPs) over the 64 Kbit B channel with HDLC framing in order to transmit signaling data. LAPs 0–29 are referred to herein as the Real LAPs, wherein each LAP is used to transmit signaling data to a corresponding one of the physical voice channels 0–29. LAPs 30–59 are referred to herein as Virtual LAPs and are also used to transmit signaling data with each of the 30 Virtual LAPs mapped to the 30 IP trunks (i.e. VLAP n=IP trunk n–30).

Figure 8:
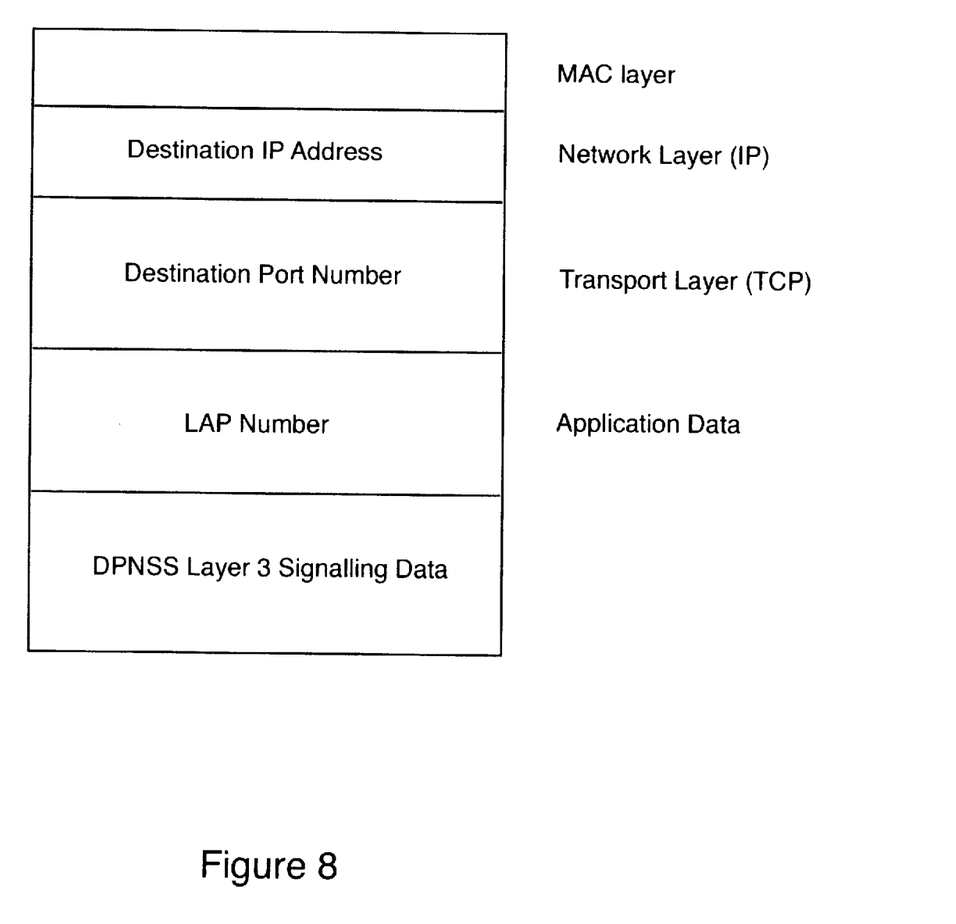
FIG. 8 shows an Ethernet frame structure including DPNSS signaling data in accordance with the preferred embodiment.

Using the information provided by Customer Data Entry (CDE 69), the signaling data to be transmitted over IP is encoded with the IP address and port number programmed for the IP trunk associated to the LAP. The LAP information is added as part of the data portion of the packet. Upon receiving the signaling data on the far end, the LAP number is used to reassociate the signaling data to the IP trunk. FIG. 8 shows sections of an Ethernet frame and the location of the data described herein above.

Returning to FIG. 6, virtual E1 card 60 includes a Call Server Message Interface 38 for providing registration with the message system to establish a communication link with the main control software 31, and to provide transport for layer 3 messages to/from the main control software residing in the PC processor 23.

Card Registration 39 is a software component which is responsible for registering the Virtual E1 card 60 as an E1 card.

The Layer 3 (DPNSS) state machine 35 is responsible for handling all layer 3 (Network) messages and which behaves exactly as the prior art E1 DPNSS layer 3 state machine running on the E1 card 21. A detailed example of operation of the state machine 35 is provided herein below with reference to FIG. 9.

The Far End DSU Message Interface Thread 61 replaces the link layer protocol provided by E1 card 21 with TCP/IP by placing the signaling data and LAP number into the data portion of an Ethernet Packet and addressing the packet to the IP address and port configured for the trunk. The packet is then transmitted over the IP network.

The following addressing rules are implemented by the Far End DSU Message Interface Thread 61:

Laps 0 & 30 are mapped to the same IP address+assigned port number as trunk 1

Laps n & n+30 are mapped to the same IP address+ assigned port number as trunk n

...

Laps 29 & 59 are mapped to the same IP address+assigned port number as trunk 30

Upon receiving an IP packet the DPNSS layer 3 data and LAP information are extracted by Thread 61 and passed on to the layer 3 state machine 35.

Connection Services 37 handle connection requests from Call Control 31 to connect the voice stream from an IP trunk to the MVIP bus 28. These requests are passed on to the Ethernet to TDM card 51 for implementation. The Connection Services 37 also performs the mapping of each trunk to a send and receive socket (IP address and port number) to be used by the E2T card 51 for streaming voice over IP. The IP address of each trunk is assigned in CDE 69. Port mappings use an algorithm based on trunk number. Specifically, the port number is calculated with the following equation:

receive port number=5000+(n×2) where n equals the IP trunk number on the card (0–29)

transmit port number=5000+((n×2)+1) where n equals the IP trunk number on the card (0–29).

The Ethernet to TDM card interface 51 connects a specified channel on the MVIP bus 28 and provides TDM to IP packet voice conversion. Voice Packets are streamed to the specified socket (IP address+port number) determined by the Connection Services software 37. The card 51 contains a 10 base T Ethernet interface and supports a TCP/IP stack 67. Consequently, there is no need for a separate LAN Network Interface Card (NIC).

Figure 9:
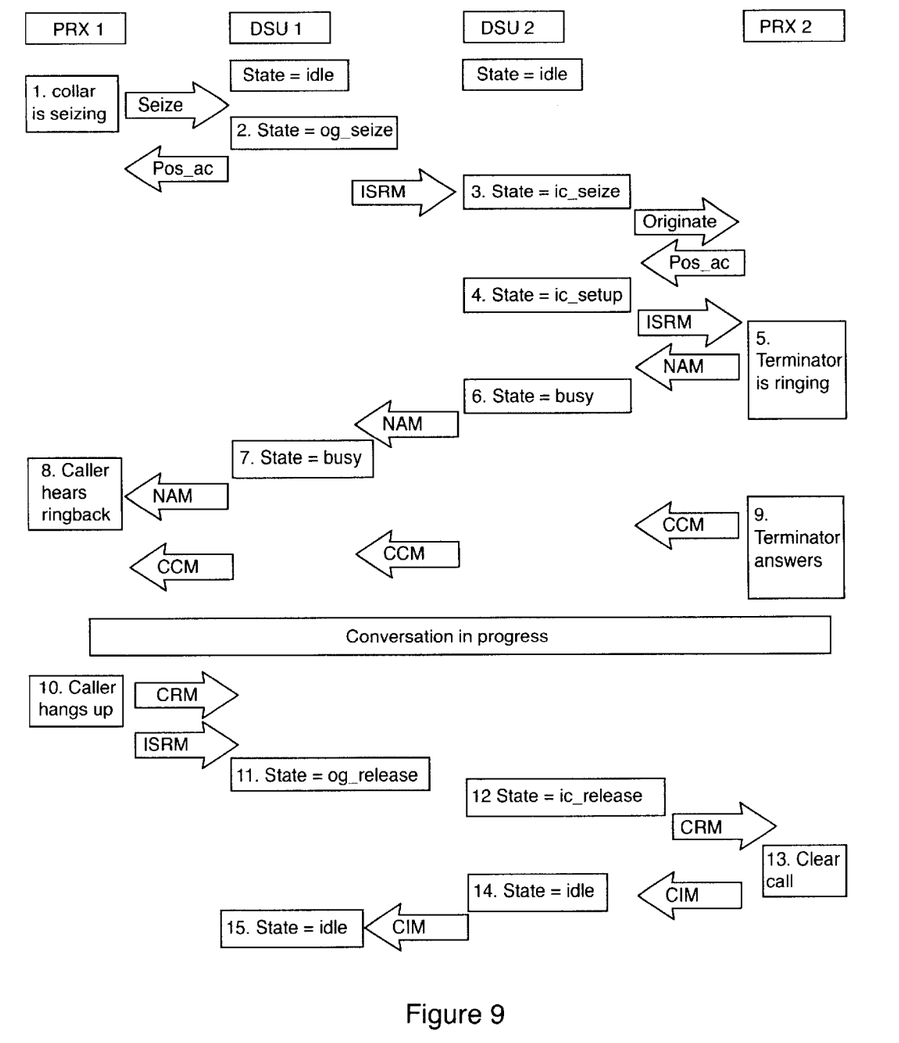
FIG. 9 is a message flow diagram showing operation of the virtual E1 card of the preferred embodiment.

In FIG. 9, PBX 1 and PBX 2 are used to designate the PBX systems implemented by the Telecom Servers 1 and associated equipment and processes of FIG. 4, at two geographically separated locations, while DSU 1 and DSU 2 represent the virtual E1 card software components executing on the PC Processors 23 at both locations.

1. In order to initiate a DPNSS call, the originator on PBX 1 must go off-hook and dial the digits of the other party. In response, the PBX 1 routes the call to try and seize a DPNSS trunk. A Seize message is sent to the DSU to try and seize a trunk.
2. Upon receipt of the Seize message, DSU 1 changes the state of the trunk from idle to og_seize (outgoing seize). A Pos_ack is returned to the PBX, which then sends an ISRM to the DSU. ISRM is the Initial Service Request Message, which is the first DPNSS message sent out during a basic DPNSS call. The ISRM is sent to the far end by DSU 1 without any further state change.
3. When an ISRM is received by the far end DSU (DSU 2), the trunk's state is changed from idle to ic_seize (incoming seize). An Originate message is sent to PBX 2 to inform it that an incoming DPNSS call has arrived. PBX 2 responds with a Pos_ack message to DSU 2 after processing the Originate message.
4. When DSU 2 receives the Pos_ack message back from PBX 2, the state of the trunk is moved from ic_seize to ic_setup. The ISRM originally sent from PBX 1 is retrieved from memory and sent to PBX 2.
5. When PBX 2 receives the ISRM, the terminating party is seized and begins to ring. A NAM (Network Acknowledgment Message) is sent back to the originating PBX to indicate that the terminating party is ringing.
6. DSU 2 moves the state of the trunk from ic_setup to busy when it receives the NAM. The NAM is then sent back to the originating PBX.
7. When DSU 1 receives the NAM, it moves its trunk state from og_seize to busy and forwards on the NAM to PBX 1.
8. Upon receipt of the NAM, PBX 1 applies ringback tone to the caller and waits for the terminator to answer.
9. When the terminator answers the call, a CCM (Channel Connect Message) is sent back to the originating PBX to indicate that the terminating party has answered, and both parties enter a talk state. Note that both DSU 1 and DSU 2 simply pass on the CCM message to the appropriate end points—no additional state changes or handling is required.
10. When one of the parties hangs-up (in this example, the caller), a CRM (Clear Request Message) is sent to the DSU to begin clearing down the call.
11. When DSU 1 receives a CRM from PBX 1, the DSU changes the state of the trunk from busy to og_release. The CRM is then sent to the far end.
12. When DSU 2 receives the CRM, it moves the trunk state from busy to ic_release and forwards the CRM to the PBX.
13. When PBX 2 receives the CRM, the call is cleared and a CIM (Channel Idle Message)is sent back to the DSU to acknowledge the CRM.
14. When DSU 2 receives the CIM, the trunk state is moved to idle and the message is sent to the other PBX.
15. Upon receipt of the CIM, DSU 1 changes the trunk state from og_release to idle. Notice that there is no need to forward the CIM to the PBX.

In summary, according to the present invention a DPNSS-over-IP system is provided which utilizes an Ethernet-to-TDM card and a virtual E1 card software process for providing 30 IP trunks which use packet switching to transport voice and data, thereby reducing leased line costs over prior art systems which use traditional E1 or T1 trunks between PBXs.

Alternatives and variations of the invention are possible within the sphere and scope of the claims appended hereto.

What is claimed is:

1. A packet switched communication system providing DPNSS standard voice and signaling data over IP, comprising:

connection services software for mapping IP addresses and port numbers to a plurality of IP trunks, each of said IP addresses being used by a network layer of said DPNSS standard to route packets to a predetermined terminating node and each of said port numbers being used by a link layer of said DPNSS standard to deliver said signaling data to a predetermined port within said terminating node; and a far end message interface thread for placing said signaling data and a Link Access Protocol (LAP) number into a data portion of each said packet to permit reassociation of the signaling data at said terminating node to an associated one of said IP trunks.

2. A packet switched communication system providing DPNSS standard voice and signaling data over IP, comprising:

connection services software for mapping IP addresses and port numbers to a plurality of IP trunks, each of said IP addresses being used by a network layer of said DPNSS standard to route packets to a predetermined terminating node and each of said port numbers being used by a link layer of said DPNSS standard to deliver said signaling data to a predetermined port within said terminating node; and a far end message interface thread for placing said signaling data and a Link Access Protocol (LAP) number into a data portion of each said packet to permit reassociation of the signaling data at said terminating node to an associated one of said IP trunks, said far end message interface thread placing each said LAP number into said data portion of said packet for thirty of said IP trunks, wherein
- LAP number 0 and LAP number 30 are mapped to a predetermined one of said IP addresses and port numbers assigned to a first one of said IP trunks;
- LAP number n and LAP number n+30 are mapped to a respective one of said IP addresses and port numbers assigned to an nth one of said IP trunks; and
- LAP number 29 and LAP number 59 are mapped to a further one of said IP addresses and port numbers assigned to a thirtieth one of said IP trunks.

3. The packet switched communication system of claim 2, further comprising a state machine for implementing network layer massage handling according to said DPNSS standard.

4. The packet switched communication system of claim 3, wherein said connection services software, said far end message interface thread and said state machine are implemented in virtual E1 card software.

5. The packet switched communication system of claim 4, wherein said virtual E1 card software further includes a message interface for controlling message exchange between said connection services software, said far end message interface thread, said state machine and main control software of said communication system.

6. The packet switched communication system of claim 5, further including an Ethernet-to-TDM (E2T) card for converting between TDM voice channels and IP voice packets.

* * * * *